Patented Apr. 27, 1937

2,078,241

UNITED STATES PATENT OFFICE 2,078,241

PRODUCTION OF FURFURAL

Ellis I. Fulmer, Leo M. Christensen, and Ralph M. Hixon, Ames, Iowa, assignors to The Chemical Foundation, Incorporated, a corporation of Delaware No Drawing. Application December 14, 1935, Serial No. 54,374

17 Claims. (Cl. 260—54)

It has long been known that pentoses such as xylose, pentosans such as xylan, and pentosan-containing materials such as cereal straws and husks, corn-cobs and wood, yield furfural when heated with dilute mineral acids. At the present time furfural is commercially manufactured from oat hulls by a process involving acidification with sulfuric acid, steam distillation and subsequent separation of the furfural and water by fractional distillation and decantation.

Furfural is rapidly polymerized under the conditions which bring about its formation, with the result that present commercial yields are only about 50 per cent. of that theoretically obtainable. Furthermore, the isolation of the furfural from the distillate is a tedious and expensive procedure.

It is the object of this invention to provide an improved alternative procedure which will be free to a great extent from the above difficulties and which will, therefore, while affording an increased yield, also effect a saving in time, labor and cost, and thereby permit a lower price for furfural, making it possible to expand the market for this product as obtained from farm wastes.

Our process differs from that at present used chiefly in the manner by which the furfural is removed from the reaction medium and the chief advantage of our process results from the more rapid removal thus obtained, so that less of the furfural formed undergoes polymerization and loss. In addition, however, our process yields furfural in a solution from which it may be recovered by simple fractional distillation, thus appreciably lowering the processing cost. Prior processes require and involve an antecedent steam distillation. Furthermore, the acid concentrations used in our process are much lower than those used in the prior art and thus further reductions in the cost of processing are obtained.

In our process, dehydration and condensation of the pentose or pentose-yielding substance to produce furfural is conducted in an aqueous medium containing a suitable concentration of acid and salt, the salt functioning to increase the activity of the acid and to decrease the solubility of furfural. We remove the furfural from the reaction medium by means of a solvent which is relatively immiscible with water but in which furfural is soluble, and extract the liquid in the aqueous phase. In this manner we have obtained yields of furfural of as much as 80 per cent. of theoretical as compared with the 50 per cent. obtained by present methods.

In our process, we may employ directly such materials as oat-hulls, corn-cobs, cereal straws, cotton seed hull bran, wood, or similar materials, or we may first prepare the pentose, such as xylose, or the pentosan, such as xylan, from such materials by methods already known to those skilled in the art, and use these materials, either in dry form or in solution, in our process. We may use various salt-acid combinations and may employ any of a number of extracting agents. The salt-acid mixture must, however, give a reaction more acid than about pH 1.0 and the solvent must be of convenient boiling point, be relatively immiscible in water and in the reaction medium, be a good solvent for furfural, and further must not itself react with the other materials employed.

The furfural-yielding material is placed in a suitable vessel with the acid and salt. This mixture is heated to the proper temperature and continuously extracted with the furfural solvent. The furfural is thus removed and may be concentrated in the receiving vessel by distilling off the solvent, when it is the lower boiling constituent, the solvent being used to extract additional furfural from the reaction medium. If the solvent-furfural extract is appreciably acid, it is usually desirable to add a neutralizing agent, such as calcium carbonate, to the receiver. The furfural is then recovered in pure form by fractional distillation of the solvent-furfural mixture.

It is obvious that acid concentration, salt concentration, temperature and time of heating are factors of the greatest importance. Thus, for each combination of acid and salt, there is some minimum time of heating and extracting at the temperature selected. This is clearly shown by the data in the following table, which gives the results obtained when a solution containing 20 grams of xylose per 100 cc., saturated with sodium chloride and containing the indicated amount of hydrogen chloride, was extracted with toluene at 105° C. The best yields of furfural and the time of heating required are shown.

| Normality of acid | Time of heating and extracting to give maximum furfural yield in hours | Maximum furfural yield in grams per 100 grams of xylose added |
|---|---|---|
| 0.25 | 35 | 13 |
| 0.50 | 38 | 10 |
| 0.75 | 41 | 7 |
| 1.00 | 40 | 5 |
| 1.50 | 39 | 3 |
| 2.00 | 37 | 2 |

We have used other solvents such as benzol and carbon tetrachloride with equally good results. Other salt-acid combinations, such as sulfuric acid-sodium sulfate, phosphoric acid-sodium phosphate, hydrofluoric acid-sodium fluoride, have generally been less satisfactory than hydrochloric acid-sodium chloride, but may be used. Also mixtures of acids may be used, with advantage, when such mixtures possess desirable properties not afforded by either acid used alone, e. g.

a mixture of hydrofluoric acid with sulfuric acid affords an acidity equally that of a superconcentrated hydrochloric acid. In general, lowering the reaction temperature increases the time and/or acid concentration required, and we prefer to operate near the boiling point of water at the pressure employed. We may use lower salt concentrations but this also increases the time of reaction and/or acid concentration necessary and generally has given lower yields than those obtained with greater salt concentrations. We therefore prefer to employ sufficient salt to produce a solution saturated at the reaction temperature.

The following are examples of the way in which we operate our process, but we do not limit ourselves to these examples. Thus, we may employ other solvents than toluene, other acids than hydrochloric, or other salts than sodium chloride, or other pressures than atmospheric, without departing from the scope of this invention.

Example 1

In this example, 100 parts of oat hulls of 10 per cent. moisture content and 100 parts of sodium chloride were added to 300 parts of 1.00 N-hydrochloric acid (36.5 grams of HCl per 1000 cc.). Three hundred parts of toluene were added to the receiver and distilled to fill the extraction flask, which was fitted with a reflux condenser, to the overflow, the condensed toluene entering the reaction flask below the surface of the reaction medium. About one-third of the toluene remained in the receiver. The reaction flask was then heated to 105° C. and the extraction continued, the furfural-toluene mixture returning to the receiver. After five hours of extraction, during which the temperature of the reaction was held at 105° C., the furfural-toluene mixture was removed from the receiver and from the reaction vessel and the furfural recovered by fractional distillation, the yield being 18 parts by weight of the oat hulls used. The theoretical yield of furfural, as measured by the standard analytical procedure, was 21.5 per cent. Thus the yield by our process was 83.5 per cent. of the theoretical.

The expression "water immiscible solvent", and similar expressions used in the applicants' claims, is intended to define a solvent which has a decided and preferential affinity for the furfural and which rejects water or does not mix with water to any material degree. The expression is not intended to require the use of solvents which present an absolute insolubility with water for, as a matter of fact, some of the preferred solvents described by the applicants, such as benzol or toluene, do take up water to some minor degree. The essence of the invention is to remove furfural as formed, from an aqueous phase, and largely absorb it in a solvent phase, which solvent phase is substantially non-aqueous, so that the furfural is thereby protected from polymerization and other reactions which would occur in the aqueous phase under the conditions of the treatment.

Example 2

In this example, 120 parts of a solution containing 19 parts of xylose were used. To this were added 45 parts of sodium chloride and sufficient hydrochloric acid to give a normality of 0.50. This was heated to 105° C. and extracted with toluene as before for five hours. The yield of furfural was 9.1 parts by weight. The theoretical yield is 63.4 per cent. by weight, or 12.9 parts by weight from the 20 parts of xylose used in this sample. The actual yield was, therefore, 70 per cent. of the theoretical.

Having thus described our invention, we claim as new:

1. The process of producing furfural consisting in reacting a furfural-yielding material with a suitable acid, in an aqueous medium, simultaneously extracting the reaction product with a liquid solvent of furfural which is immiscible with water, and fractionally distilling the resulting solution.

2. The process of producing furfural consisting of reacting a furfural-yielding material with a suitable acid in an aqueous medium, in the presence of a salt adapted to decrease the solubility of furfural, and simultaneously extracting the reaction product with a liquid solvent of furfural which is immiscible with water.

3. The process of producing furfural consisting in reacting a furfural-yielding material with a suitable acid, in an aqueous medium in the presence of a salt adapted to increase the activity of said acid, and simultaneously extracting the reaction product with a water-immiscible solvent of furfural.

4. In a process for the production of furfural comprising reacting furfural-yielding material with a suitable acid in an aqueous medium, the step consisting in effecting the said reaction in the presence of a liquid, water immiscible furfural solvent to extract the furfural as formed.

5. In a process for the production of furfural comprising reacting furfural-yielding material with a suitable acid, in an aqueous medium, the step consisting in continuously adding to said reacting medium, during the reaction, a liquid furfural solvent which is immiscible in water, and mixing with said acid a second acid adapted to raise the acidity of the mixture above that of either component acid.

6. The process of removing furfural as formed by the reaction of a furfural-yielding material with an acidulating agent in an aqueous medium, which consists in preventing the polymerization of the furfural by extracting the reaction product as formed with a liquid furfural solvent which is relatively immiscible with water; and fractionally distilling the solution.

7. The process of removing furfural, formed by the reaction of a furfural-yielding material with an acidulating agent in an aqueous medium, which comprises, extracting the reaction product as formed with a substantially water immiscible, liquid furfural solvent, in the presence of a salt adapted to increase the activity of the acid and to decrease the solubility of furfural, and recovering the furfural from the furfural solution by fractional distillation.

8. The process for the production and isolation of furfural comprising effecting a reaction, in an aqueous medium, between furfural-yielding materials and a suitable acidulating agent, in the presence of a water immiscible, liquid solvent of furfural, removing the furfural solvent mixture from the reaction zone and separating the solvent from said solution by fractional distillation.

9. The process for the production of furfural consisting in effecting a reaction, in an aqueous medium, between furfural-yielding materials and a suitable acid, in the presence of a water immiscible, liquid solvent of furfural, removing the furfural solvent mixture and separating the solvent therefrom for reuse in the reaction.

10. The process for the production and isolation of furfural consisting in effecting a reaction, in an aqueous medium, between furfural-yielding materials and a suitable acid and in the presence of a liquid, water immiscible furfural solvent, removing the solvent mixture from the reaction zone, separating the solvent from the mixture and recycling the solvent to the reaction zone.

11. A process for the production and isolation of furfural consisting in effecting a reaction between furfural-yielding materials and an acidulated aqueous medium, said medium containing a suitable concentraction of an acid and a salt adapted to decrease the solubility of the furfural, simultaneously extracting the furfural with an excess of a liquid, water immiscible furfural solvent, and subjecting the furfural solution to fractional distillation.

12. The process of isolating furfural as formed by the reaction of a furfural-yielding material with an acidified aqueous medium comprising effecting said reaction in the presence of toluene, and subjecting the resulting toluene solution of furfural to fractional distillation.

13. The process of isolating furfural as formed by the reaction of a furfural-yielding material with acidified aqueous medium comprising effecting the reaction in the presence of toluene to extract the furfural as formed, withdrawing the toluene solution of furfural from the reaction zone, separating the toluene from the solution and returning the toluene to the reaction zone.

14. The process of isolating furfural as formed by the reaction of a furfural-yielding material with an aqueous medium acidified with hydrochloric acid, consisting in extracting the reaction product as formed with toluene, removing the resulting toluene solution of furfural from the reaction zone, subjecting the solution to fractional distillation and recycling toluene to the reaction zone.

15. The process of isolating furfural as formed by the reaction of a furfural-yielding material with an aqueous hydrochloric acid solution comprising extracting the reaction product as formed with toluene, removing and neutralizing the solvent extract and subjecting the toluene solution of furfural to fractional distillation.

16. The process of isolating furfural as formed by the reaction of a furfural yielding material with an acidified aqueous medium comprising effecting the reaction in the presence of benzol to extract the furfural as formed in the benzol solution, removing the benzol solution of furfural and subjecting such solution to fractional distillation.

17. The process of isolating furfural as formed by the reaction of a furfural-yielding material with an acidified aqueous medium comprising effecting such reaction in the presence of benzol to extract the furfural as formed, removing the benzol solution of furfural from the reaction zone, separating the benzol therefrom and returning the benzol for reuse in the extraction.

ELLIS I. FULMER.
LEO M. CHRISTENSEN.
RALPH M. HIXON.